(No Model.)
C. HÜBNER
BRIDLE BIT.
No. 345,592. Patented July 13, 1886.
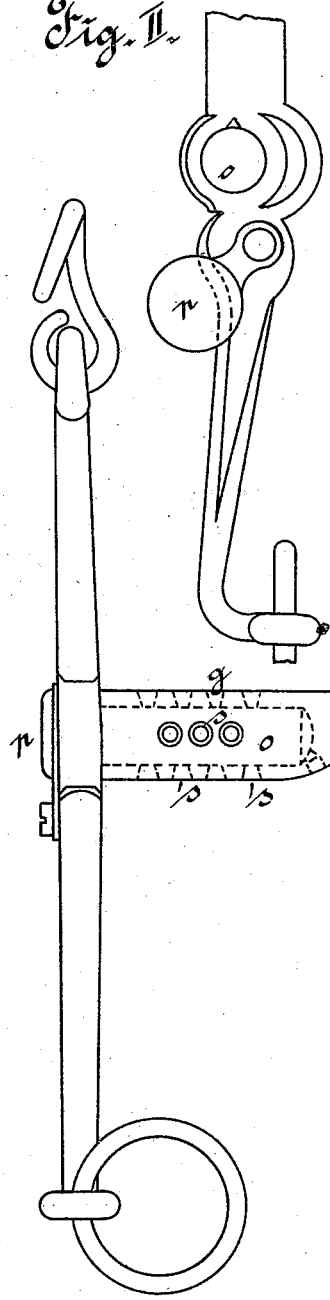
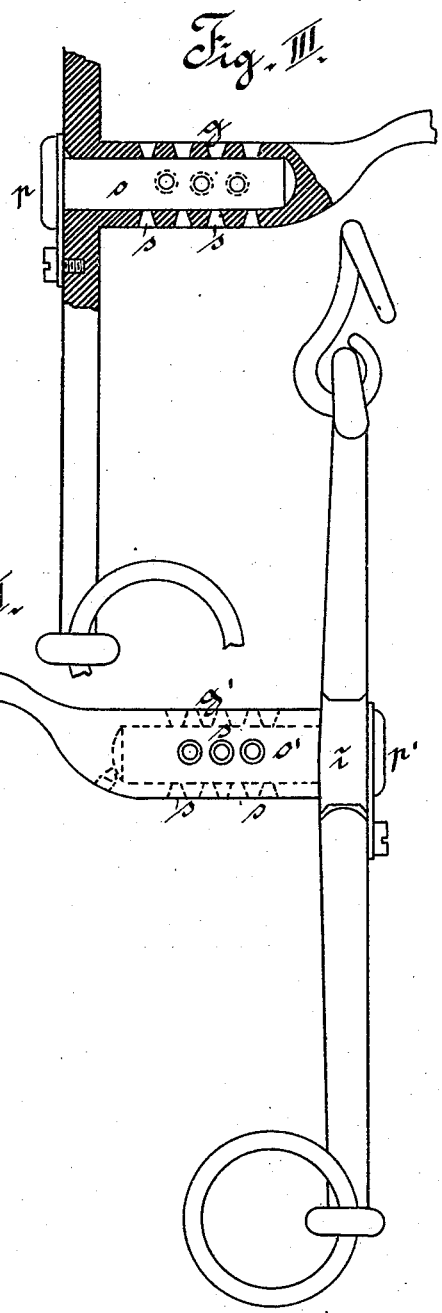
Witnesses:
W. Pell Pulis.
H. M. Supple.
Inventor.
Curt Hübner,
By Richards & Co.
Attorneys

UNITED STATES PATENT OFFICE.

CURT HÜBNER, OF BERLIN, GERMANY.

BRIDLE-BIT.

SPECIFICATION forming part of Letters Patent No. 345,592, dated July 13, 1886.

Application filed August 31, 1885. Serial No. 175,712. (No model.)

*To all whom it may concern:*

Be it known that I, CURT HÜBNER, a subject of the King of Prussia, residing at Berlin, in the Kingdom of Prussia, Germany, have invented certain new and useful Improvements in Bridle-Bits; and I do hereby declare that the following is a full, clear, and exact description thereof, which will enable others skilled in the art to make and use the same, reference being had to the accompanying drawings, forming part of this specification.

These improvements relate to bridle-bits and snaffles, the cross-bars or mouth-pieces of which are chambered and provided with perforations, through which a horse or other animal may suck the medicines or refreshments introduced into the said chambers, the salivary fluid dissolving the respective substance. For the purpose of introducing medicines or refreshments into the chambers of the mouth-piece various contrivances have been invented and patented. For instance, a mouth-piece consisting of two sections which are kept together by screws, the loosening of which allows the two sections to be removed from each other for inserting medicines between the same, or a central opening in the middle of the cross-bar for receiving the medicines, which opening can be closed by a screw-plug. These hitherto-known constructions have, besides their complication, the following inconveniences: The refreshments or medicines, particularly with the latter arrangement, can be introduced only in single or separate particles, but not in compact pieces, nor can the fluid medicines be introduced by means of a wet sponge; also, the mouth or tongue of the animal is more or less affected by the closing and fastening screws, in consequence of the unavoidable friction. Further, the said constructions are applicable only to rigid mouth-pieces, and not to movable mouth-pieces provided with hinges. The most important inconvenience, however, is that the refreshments and medicines can be introduced only after completely taking off the head-gear and not during its use. The screws at the hollow cross-bar must be loosened by a screw-driver after taking off the head-gear. Then the hollow of the bar is filled with the medicines, the mouth-piece is closed again, and the head-gear is put on again to the animal. Besides the trouble of these different manipulations it must be considered that during the same the animal is perfectly liberated and brought out of his bit, and is not in the power of his master. Owing to these inconveniences head-gears of this construction are but little used.

The object of this invention is to remove these inconveniences.

In the drawings, Figure I represents a front view; Fig. II, a side view with opened chamber, and Fig. III a partial vertical section.

The parts $g$ $g'$ of the cross-bar or mouth-piece G are provided with chambers $o$ $o'$, concentrically arranged within the bit, and the sides are furnished toward the mouth of the animal with small radial perforations $s$ $s'$. For introducing the medicines these chambers $o$ $o'$ are continued axially to the end of the mouth-piece, and in consequence the medicines can be introduced into the open outer ends of said chambers without taking the mouth-piece $g$ $g'$ out of the mouth of the animal. The outer ends of these chambers $o$ $o'$ can be closed by any suitable contrivance—such as a slide, cover, valve, or screw. In the drawings the closing is effected by a hinged disk, $p$ or $p'$. By this arrangement the aforesaid objections are entirely removed, for, owing to the absence of all screwing contrivances at the parts $g$ $g'$ of the bit lying in the mouth of the animal, any inconvenience and trouble or injury to the animal while using the bit is prevented; also it is possible to introduce the medicines and refreshments in a compact form—viz., as a cartridge, filling entirely the hollow space of the mouth-piece $g$ $g'$. The most important advantage, however, is the fact that the cartridge can be conveniently introduced from the saddle while riding and during the use of the bridle-bit, therefore without taking off the head-gear.

It is evident that these improvements can be applied to mouth-pieces of any description, whether they are rigid and of one piece, or movable and provided with hinge-joints.

Having thus described my invention, what I claim as new, and desire to secure by Letters Patent, is—

A bridle-bit centrally chambered at its ends, provided with radial ducts leading from its said chamber to the periphery of the bit in the part grasped in the horse's mouth, and provided with the removable caps in its extreme outer ends, independent of the organized bit and check-pieces, for the insertion of any medicament into the chambers of the bit, and the securing of the same in place therein without removing the bit from the horse's mouth, substantially as shown and described.

In testimony whereof I have signed this specification in the presence of two subscribing witnesses.

CURT HÜBNER.

Witnesses:
B. ROI,
H. POHLMANN.